United States Patent [19]

White

[11] Patent Number: 4,508,372

[45] Date of Patent: Apr. 2, 1985

[54] GREASE GUN EXTENSION ASSEMBLY

[76] Inventor: Frank L. White, 870 Bridge St., Philadelphia, Pa. 19124

[21] Appl. No.: 270,700

[22] Filed: Jun. 5, 1981

[51] Int. Cl.³ ............................................. F16L 55/00
[52] U.S. Cl. .................................... 285/175; 285/12; 285/315; 285/332; 285/341; 184/105 C
[58] Field of Search .................. 285/83, 102, 105, 306, 285/86, 315, 316, 12, 332, 24, 175, 341, 342, 343; 184/105 A, 105 B, 105 C

[56] References Cited

U.S. PATENT DOCUMENTS

| 1,467,508 | 9/1923 | Seng | 285/315 X |
| 1,802,700 | 4/1931 | Boker | 184/105 B |
| 1,945,699 | 2/1934 | Morrow et al. | 184/105 B |
| 2,003,708 | 6/1935 | Eisenhauer | 184/105 C |
| 2,404,052 | 7/1946 | Ginter | 285/316 |
| 3,180,533 | 4/1965 | Sundholm | 184/105 B |
| 3,554,324 | 1/1971 | Watley | 184/105 C |
| 3,589,470 | 6/1971 | Dorn | 184/105 C |

FOREIGN PATENT DOCUMENTS

| 434020 | 8/1935 | United Kingdom | 285/341 |
| 1314816 | 4/1973 | United Kingdom | 285/315 |

Primary Examiner—Dave W. Arola
Attorney, Agent, or Firm—John J. Simkanich

[57] ABSTRACT

An extension assembly for a grease gun for coupling to the alemite fitting typically found on the discharge end of such a gun includes a body portion having a grease fitting, a mechanical support positionable thereabout and an extension tube providing a predetermined fixed pathway, and being sealably connected to the body, this extension tube being of a length and shape suitable to a particular job and including a formed application tip, whereof said body portion and extension tube provide a contiguous passageway for grease flow from the fitting to tip.

10 Claims, 4 Drawing Figures

GREASE GUN EXTENSION ASSEMBLY

BACKGROUND OF THE INVENTION

This invention relates generally to a grease gun adapter suitable for attachment to a conventional grease gun coupler and in particular those grease gun adapters of particular length and shape for special purpose applications, including the adapter fittings thereto.

Hand-operated grease guns, and portable hand-operated grease cannisters are widely used for applying grease in many applications to automotive, farm, aircraft and industrial equipment. In dispensing the grease from such guns, the operator must usually grasp the dispensing barrel with one hand and the dispensing or pressure operating lever with the other. Considerable force must usually be applied to generate the required pressure within the cylinder of the dispensing head to operate the grease dispensing device. As such, the operator does not have a free hand for holding, or directing, the grease applicator conduit, or associated coupler and fitting.

Fittings with sealed lubrication areas such as sealed bearings, sealed universal joints, pillow block bearings and the like are often found. These fittings, however, require lubrication on occasion. Moreover, many hinges, operating levers, and gear or alternately pressure surfaces require lubrication of small amounts of grease. In these instances a standard grease fitting of the ball adapter type is not adequate and is inconvenient to operate.

Dorn, U.S. Pat. No. 3,589,470, and Sundholm, U.S. Pat. No. 3,180,533, have taught two types of needle adapter fittings for grease guns for use in tight or constricted applications. The Dorn device, FIG. 1 of his patent, teaches a special purpose needle extension having a compound two-piece adapter for mating directly onto the alemite-type fitting of a standard grease gun. The ball grease fitting as taught by Dorn has a flange which is intended to abut against the end of the grease gun fitting and be held securely thereto by the tension of the grease gun fitting jaws.

Sundholm teaches a similar needle adapter having a specific adapter body as part of its tip or discharge portion and a connector body with a ball-shaped grease fitting, this connector body having a built-up portion against which the discharge fitting of the grease gun abuts. Sundholm, like Dorn, depends upon the compression jaws of the discharge fitting of the grease gun to securely hold his adapter to the grease gun fitting.

Both Dorn and Sundholm teach relatively short adapter needles. This being the case, the connection between the grease gun discharge fitting and the adapter body is normally held by the operator in directing the very short needle.

In situations, however, where an extended needle adapter or an adapter of unusual shape is required, including an adapter having a number of bends, the operator is not able to grasp the adapter at the grease gun fitting while directing the operation of the adapter and thereby is not able to support that coupling. Very often the operator must grasp the extension needle or rod close to the discharge end thereof. In instances where this must be done, the usual stress applied to the flexible grease hose tends to stress the coupling of the adapter to the grease gun discharge fitting. In instances where the grease gun discharge fitting jaws are worn or have reduced spring tension, or the ball of the grease fitting is worn or undersized, the coupling very often breaks, causing a disruption in the greasing operation, and very often, the loss of grease, or more importantly, a contamination of the grease couplings or grease fitting with dirt.

Adapters as taught by Dorn and Sundholm also have a substantial amount of hardware or fittings dedicated to each needle portion.

What is desired, therefore, is a grease gun extension assembly which provides for a rigidity at the coupling point with the grease gun discharge fitting, which resists the premature uncoupling at this location. What is also desired is a grease gun extension assembly capable of many and varied extension rod configurations, with a minimum of dedication of hardware to each specific extension rod configuration, thereby providing a commonality of parts and reduction in cost in manufacture.

An object of the present invention is to provide a grease gun extension assembly, or a collection of extension assemblies having a commonality of component parts.

A second object of this invention is to provide such collection of extension assemblies with individually dedicated grease flow extension rods and a commonality of components for coupling each individual rod to an alemite-type grease fitting.

Another object of this invention is to provide such commonality of components with the capability of lockably rigidifying the connection at the alemite-type grease fitting.

A further object of this invention is to provide each of such individually dedicated grease flow extension rods with a constricted end for a fine bead grease flow ejection.

SUMMARY OF THE INVENTION

The objectives of this invention are realized by a grease gun assembly for coupling to the alemite fitting typically found on the discharge end of a grease gun. This assembly includes a ball-type grease fitting mounted on one side of a body portion being an extension cylindrical pipe or nipple, this side of the pipe nipple having an annular shoulder on which an interlocking member resides.

A mechanical support tubular sleeve is selectively slidably positionable along the extension nipple for sliding over and about the interlockment of the alemite fitting and ball fitting in retained position with the interlocking member.

Any of variously shaped rigid extension tubes includes a pressure responsive sealing member and a mating cap nut for holding this sealing member and extension tube to the other end of the extension pipe nipple.

DESCRIPTION OF THE DRAWINGS

The advantages, structural features and operation of the subject invention can easily be understood from a reading of the detailed description which follows, in conjunction with the accompanying drawings in which like numerals refer to like elements, and in which.

DETAILED DESCRIPTION OF THE INVENTION

Figure 1:
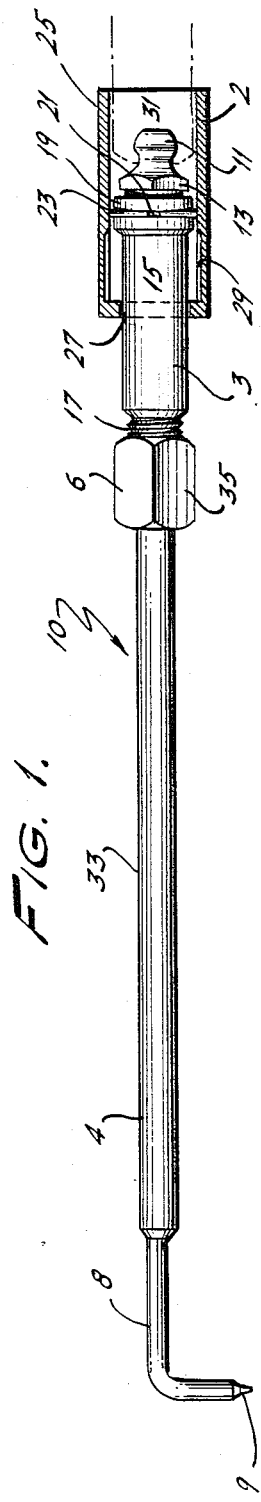
FIG. 1 shows a partial cutaway view of an assembled grease gun extension assembly.
Figure 2:
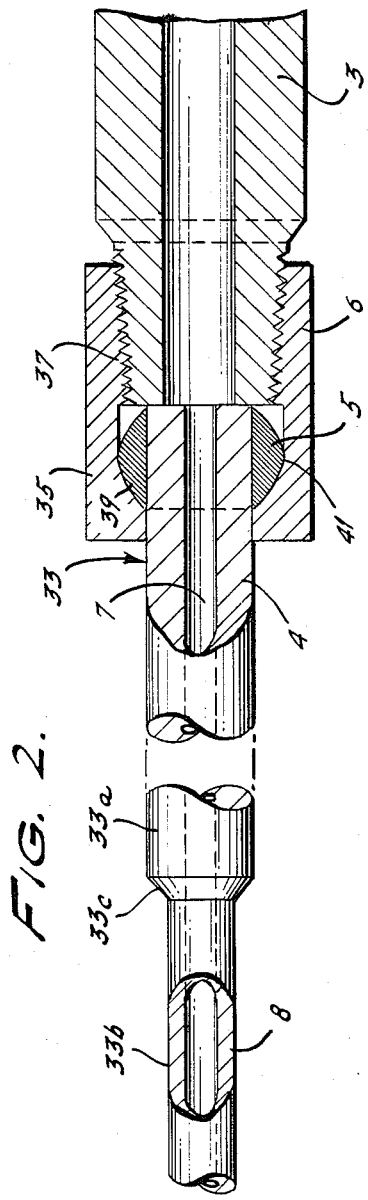
FIG. 2 shows a cross sectional view of the assembly of FIG. 1 through the compression cap area.

A grease gun extension assembly for coupling to the alemite-type fitting typically found on the discharge end of a grease gun is shown in FIG. 1. This assembly 10 has a ball-type grease fitting 11 commonly available in the marketplace. This ball fitting 11, FIG. 1, includes a hexagon-shaped wrenching surface 13 and a threaded portion extending therefrom (not shown in the drawing).

The ball fitting 11 threads mate with threads on the interior bore of an extension nipple 15. This extension nipple can be of any suitable dimensions and is typically about 2 inches long and has an outside diameter of about ½ inch. The end of the nipple 15 opposite the ball fitting 11 has male threads cut in the exterior cylindrical surface.

An annular cylindrical shoulder 19 extends about the exterior of the cylindrical nipple 15 at the ball fitting 11 end thereof. This cylindrical shoulder 19 has an annular groove 21 extending in its outer surface at about midgirth. Positioned in this annular groove 21 is a split compression ring 23. While the cylindrical shoulder 19 can be of many widths, a ½ inch width is adequate.

Situated about the ball fitting 11, cylindrical shoulder 19 and split compression ring 23 is a cylindrical sleeve 25. The cylindrical sleeve is mounted over the nipple 15 from the thread 17 portion thereof to have an open end extending beyond the ball fitting 11. The end of the sleeve 25 from its open end is closed except for a round opening 27 therethrough concentric about the longitudinal centerline of the sleeve. This round opening 27 is of slightly larger dimension than the outside diameter of the nipple 15 (about ½ inch, plus).

A tapered annular depression 29 extends about the interior surface of the sleeve 25 at the closed end having the opening 27. The taper on this depression 29 extends toward the opposite or open end of the sleeve.

The sleeve 25 inside diameter (about ⅝ inch) is slightly larger than the outside diameter (about 9/16 inch) of the cylindrical shoulder 19 of the nipple 15. The length of this sleeve 25 is approximately equal to the distance from the bottom of the male threads 17 to the outside face of the cylindrical shoulder 19 (about 1½ inches). The outside diameter of the cylindrical shoulder 19 is approximately the same dimension as the outside diameter of an alemite coupling 31 of the grease gun, to which the extension assembly is coupled via the ball fitting 11 (about 9/16 inch).

With the alemite fitting 31 uncoupled, the sleeve 25 is slidably positioned with its open end approximately adjacent to the end face of the cylindrical shoulder 19. Once the alemite fitting 31 and the ball fitting 11 are coupled, the sleeve 25 is slid to embrace the cylindrical shoulder 19, split compression ring 23, and alemite fitting 31, securing this coupling from lateral movement. The compression ring 23 expands into the tapered depression 29 interlockably holding the sleeve over the mated couplings 11, 31 at a position with its closed end abutting the inner face of the cylindrical shoulder 19.

The threaded end 17 of the nipple 15 is mated to any of a plurality of various shaped extension tubes 33 by the threaded engagement of a cap nut 35.

Cap nut 35 has a hexagon-shaped wrenching outer surface and is easily purchased or manufactured in the industry as a standard assembly item. The cap nut 35 has female threads 37 for mating with the male threads 17 of the nipple 15. The base 39 of the cap nut 35 has a tapered inner surface and a round hole therethrough of a size slightly larger than the outside diameter of the round extension tube 33. Positioned about the end of the extension tube 33, which is parted-off square for mating with the parted-off square end of the nipple 15 threaded end, is a compression ring 41. This compression ring 41 has an inside diameter approximately equal to the outside diameter of the extension tube 33 (about ¼ inch), and has a rounded outside surface which is acted upon by the tapered end 39 of the cap nut 35. When the cap nut 35 is screwably assembled onto the threads 17 of the nipple 15, the mating end of the extension tube 33 is aligned with the nipple 15 and held tightly against the end thereof. As the cap nut 35 is tightened down on the threads 17 of the nipple 15, the compression ring 39 is deformed, forming a tight pressure seal between the extension tube 33, the cap nut 35, and the threaded end of the nipple 15.

The extension tube 33 has a first larger outside diameter section 33a (about ¼ inch), which mates with the cap nut 35 and nipple 15, and a smaller outside diameter portion 33b extending therefrom, the smaller outside diameter portion 33b (about ⅛ inch) intended for the particular use of application for the extension assembly. The extension tube 33 includes a tapered shoulder 33c, which forms the transformation from the larger to smaller diameter portions, 33a, 33b, respectively.

Figure 3:
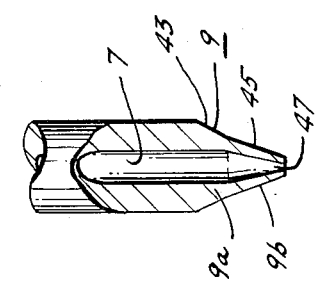
FIG. 3 shows a cross sectional view of the grease discharge tip of the assembly of FIG. 1.
Figure 4:
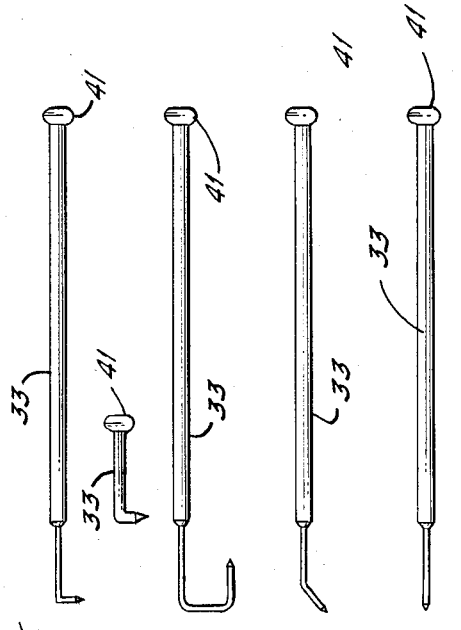
FIG. 4 shows any of the various shaped extension tubes with compression rings which may be assembled as the grease gun extension.

The smaller diameter portion 33b of the extension tube 33 may have any of a number of different shapes as shown in FIGS. 1 and 4. The application tip, FIG. 3, has a first ground tapered surface 43, the end of which has been mechanically worked and compressed to a different second taper 45. This compression of the end 45 provides a constricted section of the bore at the tip 45.

While the inside diameter of the assembly may vary from component to component, it is desirable to have approximately the same inside diameter throughout the assembly. Typically, the inside diameter of the nipple 15 is larger than the inside diameter of the extension tube 33. The compressed tip 45, however, provides a constricted bore 47, which has a fixed relation to the opening in the ball fitting 11.

FIG. 4 shows any of various shaped extension tubes 33, each with their own individual compression ring 41, which may be used as part of the grease gun extension assembly, the other components of the assembly being common elements for use with any of the various shaped extension tubes 33.

The components of the assembly 10 may be made from any of varied materials from plastic to fiberglass to copper, brass or steel. Typically, however, these components are made out of a chrome steel, the exception being the compression ring 41, which is typically constructed of brass. A certain amount of rigidity and strength is required of all the steel components. However, they may be made of low carbon steel. An exception to this is the compression ring 23, which is made of spring steel.

Many changes can be made in the above-described grease gun extension assembly apparatus without departing from the intent and scope thereof. Therefore, it is intended that all matter contained in the above description and shown in the accompanying drawings be interpreted as illustrative and not be taken in the limiting sense.

What is claimed is:

1. A grease gun extension apparatus capable of coupling to a grease gun fitting, comprising;
   a ball type grease fitting having a threaded end and a bore therethrough capable of coupling to said grease gun fitting;
   an extension nipple having a bore therethrough and connected to one end thereof to said threaded end of said ball type grease fitting and having a threaded portion on the opposite end thereof;
   a hollow tube having a longitudinal axis and an annular compression ring about its outer surface at a first end thereof, said first end abutting said opposite end of said extension nipple and having a tapered tip at the other end thereof, said tapered tip being defined by two tapered regions, the first tapered region being spaced from the end of the tip and being at a greater angle relative to the longitudinal axis than the second tapered region which extends from the end of the tip to said first tapered region and
   a compression nut having an internal tapered surface for compressively engaging said annular compression ring, said compression nut threadedly engaging said threaded opposite end of said extension nipple by deforming said compression ring into sealing engagement with said hollow body, compression nut and opposite end of the extension nipple as said nut is tightened for sealingly holding said hollow tube to said extension nipple.

2. The apparatus of claim 1 wherein said hollow tube is rigid having a larger outside diameter portion extending from said first end thereof and a smaller outside diameter portion extending from said larger outside diameter portion, said hollow tube having essentially the same inside bore size through said larger outside and smaller outside diameter portions.

3. The apparatus of claim 1 wherein said first tapered region is a first exterior surface taper and said second region is a second exterior surface taper.

4. The apparatus of claim 3 wherein said tube bore is constricted to a smaller size at said second region of said tip.

5. The appartus of claim 2 or 4 wherein said smaller diameter portion includes at least one bend.

6. The apparatus of claim 4 wherein said tube bore constriction at said second region of said tip is a straight angle tapering of said bore to a smaller diameter at said tip end.

7. The apparatus of claim 2 also including a cylindrical sleeve about said nipple and slidably positionable thereon.

8. The apparatus of claim 7 wherein said nipple includes an annular shoulder extending outwardly from the outer surface thereof.

9. The apparatus of claim 8 wherein said annular shoulder includes an annular groove extending thereabout; and a compression ring in said annular groove, said compression ring compressively contacting the inner wall of said cylindrical sleeve.

10. The apparatus of claim 9 wherein said cylindrical sleeve includes a tapered annular depression in said sleeve inner wall, said depression allowing a release somewhat of said compression ring from said compressive contact with said inner wall.

* * * * *